(12) United States Patent
Arteche et al.

(10) Patent No.: US 8,017,009 B2
(45) Date of Patent: Sep. 13, 2011

(54) FUEL FILTER

(75) Inventors: Julen Burgoa Arteche, Gernika (ES); Cesar Garcia Benitez, Madrid (ES); Enrique Casillas Torres, Madrid (ES); Julian De La Azuela, Madrid (ES); Candido Juara Ropero, Alcala de Henares (ES); Teresa Serrano Gil, Madrid-Boadilla del Monte (ES)

(73) Assignee: Robert Bosch GmbH, Stuttgart (DE)

( * ) Notice: Subject to any disclaimer, the term of this patent is extended or adjusted under 35 U.S.C. 154(b) by 110 days.

(21) Appl. No.: 10/565,381

(22) PCT Filed: Jul. 20, 2004

(86) PCT No.: PCT/DE2004/001574
§ 371 (c)(1),
(2), (4) Date: Jan. 23, 2006

(87) PCT Pub. No.: WO2005/009588
PCT Pub. Date: Feb. 3, 2005

(65) Prior Publication Data
US 2006/0219622 A1    Oct. 5, 2006

(30) Foreign Application Priority Data
Jul. 22, 2003 (DE) .................. 103 33 185

(51) Int. Cl.
*B01D 35/30* (2006.01)
*B01D 35/00* (2006.01)

(52) U.S. Cl. .......... 210/323.1; 210/435; 210/456; 210/320

(58) Field of Classification Search .......... None
See application file for complete search history.

(56) References Cited

U.S. PATENT DOCUMENTS

| 2,306,984 | A |   | 12/1942 | Tolman |        |
|-----------|---|---|---------|--------|--------|
| 2,477,716 | A | * | 8/1949  | Best et al. | 210/323.1 |
| 2,565,445 | A | * | 8/1951  | Winslow et al. | 210/130 |
| 4,105,561 | A | * | 8/1978  | Domnick | 210/232 |
| 4,783,266 | A | * | 11/1988 | Titch et al. | 210/695 |
| 5,376,270 | A | * | 12/1994 | Spearman | 210/445 |
| 5,451,273 | A |   | 9/1995  | Howard et al. |   |
| 5,620,599 | A | * | 4/1997  | Hopkins et al. | 210/420 |
| 5,707,518 | A | * | 1/1998  | Coates et al. | 210/232 |
| 6,361,684 | B1 | * | 3/2002 | Hawkins et al. | 210/91 |
| 6,364,121 | B1 | * | 4/2002 | Janik et al. | 210/438 |
| 2002/0017485 | A1 |   | 2/2002 | Ito et al. |   |

FOREIGN PATENT DOCUMENTS

| DE | 100 39 425 A1 | 2/2002 |
| EP | 0 943 796 A2  | 9/1999 |
| EP | 1 174 170 A2  | 1/2002 |
| JP | 3-114504      | 5/1991 |
| JP | 9-206518      | 8/1997 |
| WO | WO 96/19658 A1 | 6/1996 |
| WO | WO 01/30479 A1 | 5/2001 |

* cited by examiner

*Primary Examiner* — In Suk Bullock
*Assistant Examiner* — Madeline Gonzalez
(74) *Attorney, Agent, or Firm* — Ronald E. Greigg

(57) ABSTRACT

The present invention relates to a fuel filter having a filter element and connections for the fuel inlet and the fuel outlet. In order to permit a more compact design, the fuel filter employs flat, block-shaped filter element.

20 Claims, 5 Drawing Sheets

FUEL FILTER

CROSS-REFERENCE TO RELATED APPLICATIONS

This application is a 35 USC 371 application of PCT/DE 2004/001574 filed on Jul. 20, 2004.

BACKGROUND OF THE INVENTION

1. Field of the Invention

The present invention relates to a fuel filter with at least one filter element and connections for the fuel supply and fuel outlet.

2. Description of the Prior Art

A fuel filter of the type with which this invention is concerned, known from DE 198 11 689 A1 has a housing made of solid plastic and has a beaker-shaped bottom part and a lid-like top part that is detachably fastened to the beaker-shaped bottom part by means of a quick release. The beaker-shaped bottom housing part contains a hollow, cylindrical star filter that rests on a pedestal section. The pedestal section contains a sump for water separated out during filtration of the fuel and a water drain that can be closed by means of a screw plug. In addition, the pedestal region is provided with a fuel inlet that feeds into an inlet duct for a heating unit welded in place beneath the pedestal section. The pedestal section is also provided with an outlet duct that allows the fuel to travel from the heating unit to the dirty side of the filter. The flow passes through the filter insert radially from the outside to the inside. Its clean side is connected to an outlet fitting via which the cleaned fuel can be drained off in the direction of the engine via a first duct. In addition, the outlet fitting is provided with a second duct, which can be closed by an overflow valve and permits the fuel to be returned to the tank. The clean side of the filter is also connected to the sump.

Fuel filters of this kind are used, among other things, in the engines of motor vehicles.

One problem of these previously known filters is that they are comparatively bulky and are difficult to integrate into the engine compartment of a vehicle.

In this respect, the object of the present invention is to develop a fuel filter that permits a compact design. This object is attained with a fuel filter of the type mentioned at the beginning in that the filter element is embodied as flat.

A surprising discovery has been made that instead of star filter inserts, it is possible to use flat filter elements in which the clean side and the dirty side are situated essentially parallel to each other. This makes it possible to embody the fuel filter as a whole as flat and for it therefore to be significantly flatter than would be possible with the use of star filter inserts, while providing the same through flow capacity. This yields a significantly greater possibly structural variety, thus allowing the form of the fuel filter to be better adapted to the space available in the engine compartment.

The folding of the filter material advantageously produces a block-like or box-shaped filter element with a good stability and a large surface area.

In a preferred embodiment form of the present invention, the clean side of the filter element is encapsulated and connected to the fuel outlet. An encapsulation of this kind can, for example, be comprised of caps for covering the top side and the upper and lower ends of the filter element, and a side wall encompassing the clean side of the filter element, each made of plastic. A filter element embodied in this way can easily be inserted into a fuel filter housing without requiring an additional seal between the clean side of the filter element and its dirty side. Additional structural features and components inside the housing for dividing the clean side from the dirty side are thus rendered superfluous; the dirty side of the filter can encompass the encapsulated filter element as completely as possible.

In addition or conversely, the dirty side of the filter element can be correspondingly encapsulated and connected to the fuel inlet.

In another embodiment of the fuel filter according to the present invention, two or more filter elements are provided, which can be situated for example adjacent to each other at their upper, lower, or lateral sides, and essentially in a single plane, but can also be situated in planes extending at an angle to each other.

In an additional preferred embodiment of the present invention, the fuel inlet and the fuel outlet are situated at one end of the fuel filter or at opposite ends of the fuel filter. This makes it possible to assure that the advantage of a flat design is not canceled out by connections protruding beyond the fuel filter.

In another preferred embodiment, the flow entry of the fuel into the fuel filter housing is designed to reduce or eliminate turbulence in the region of the bottom of the fuel filter, particularly when it is horizontally oriented. It has turned out to be particularly effective to use a flow baffle in the region of the fuel inlet, which is preferably inclined upward and thus deflects the flow toward the top of the fuel filter housing.

The inlet distribution stabilizer advantageously provides for particularly favorable filtration properties of the fuel filter while requiring a remarkably low overall volume of the fuel filter.

BRIEF DESCRIPTION OF THE DRAWINGS

The present invention will be explained in greater detail below, in conjunction with drawings, in which.

DESCRIPTION OF THE PREFERRED EMBODIMENTS

Figure 1:
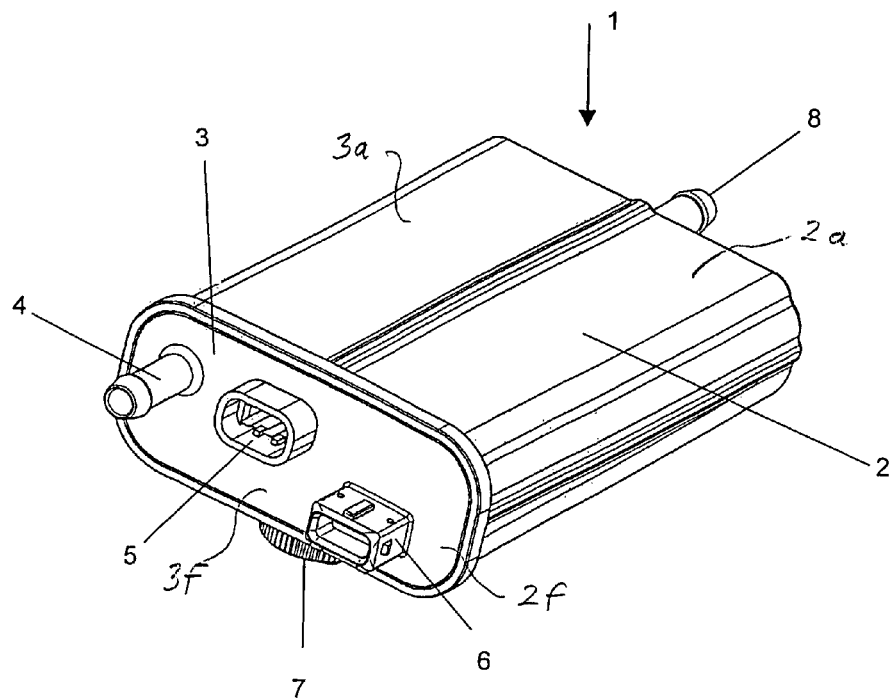
FIG. 1 is a perspective view of a first exemplary embodiment of the fuel filter according to the present invention.

The proposed fuel filter is particularly well suited for filtering fuel, particularly diesel fuel, in a fuel supply of an internal combustion engine of a motor vehicle.

FIGS. 1 through 4 show various views of and sections through a first, preferred, selected, particularly advantageous exemplary embodiment of a flat fuel filter 1.

In all of the figures, parts that are the same or function in the same manner have been provided with the same reference numerals. Provided that nothing to the contrary is mentioned or depicted in the drawings, that which is mentioned in conjunction with and shown in one of the figures applies to all of the figures and all of the exemplary embodiments. As long as nothing to the contrary is stated in the explanations, the features of the different exemplary embodiments can be combined with one another.

FIGS. 1 through 4 show the flat fuel filter 1 in an essentially horizontal orientation. The fuel filter 1 has a filter housing 2. The filter housing 2 has an upper side wall 2a, a lower side wall 2b, a first side longitudinal wall 2c and parallel to it, a second side longitudinal wall 2d, a first end 2e, and an opposite second end 2f oriented toward the cover. The filter housing 2 is essentially comprised of a housing part 3a and a cover 3f. The housing part 3a is essentially the shape of a block-like or box-shaped beaker and essentially comprises the sides 2a, 2b, 2c, 2d, and 2e of the filter housing 2. At the end 2f of the filter housing 2, the housing part 3a is closed by a cover 3f.

The filter housing 2 has an elongated, flat form whose front end 2f is closed by the cover 3f. The outside of the cover 3f is provided with a connection 4 for the fuel inlet, an electrical connection 5 for a heating unit, and an electrical connection 6 for a temperature sensor. On the underside of the filter housing 2, or more precisely, on the lower side wall 2b, a water outlet 7 is provided toward the end 2f closed by the cover 3f. The end 2e of the housing part 3a of the filter housing 2 oriented away from the cover 3f is provided with a connection 8 for the fuel outlet.

The filter housing 2 is more than twice as wide and more than three times as long as it is high. The filter housing 2, at least in a rough sense, has an approximately block-like or box-shaped form.

Figure 2:
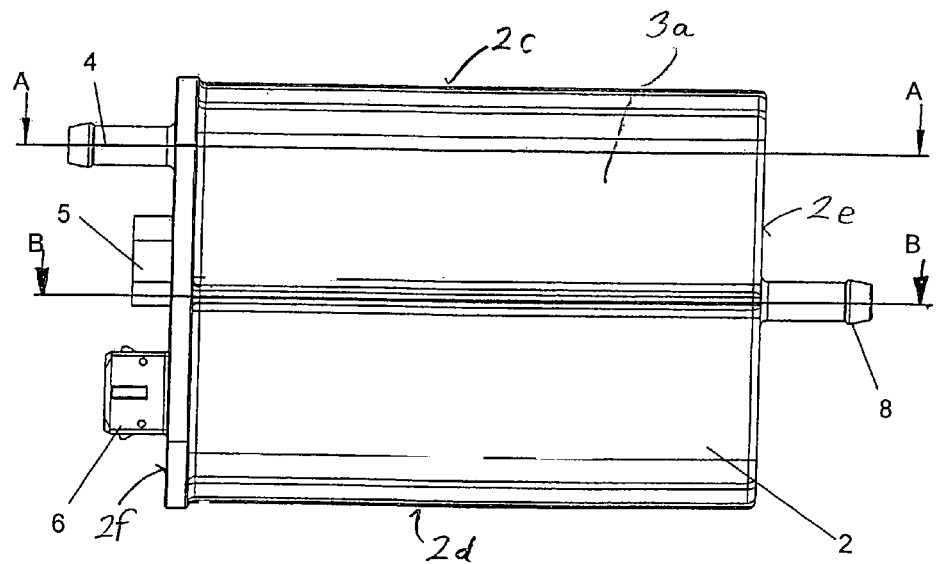
FIG. 2 shows a top plan view of the fuel filter shown in FIG. 1.
Figure 3:
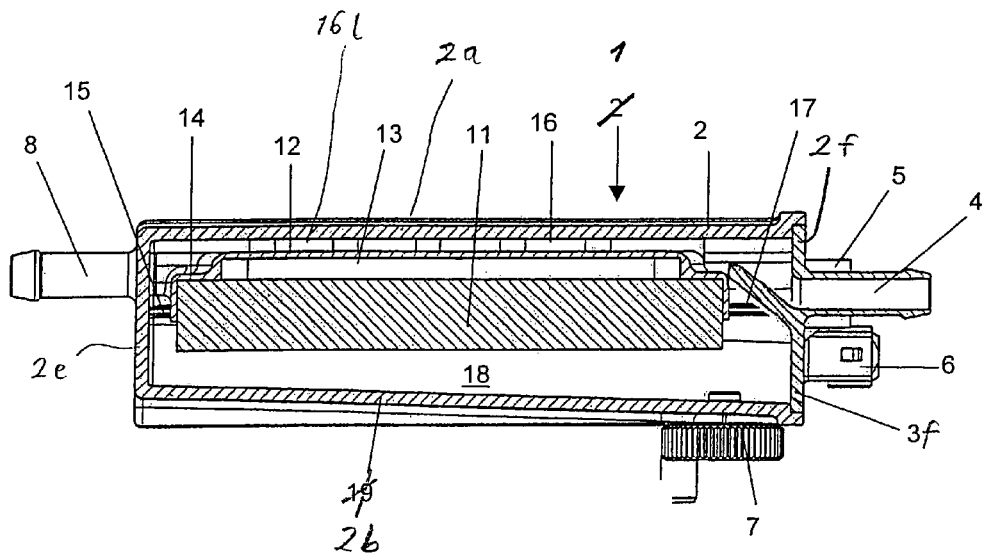
FIG. 3 shows the fuel filter in a section along the cutting line A-A according to FIG. 2.

As is particularly clear in FIGS. 2 and 3, the connection 8 for the fuel outlet extends in a plane that is parallel to the longitudinal axis, and the connection 4 for the fuel inlet extends in a plane extending parallel to this, close to the longitudinal wall 2c of the filter housing 2.

Figure 4:
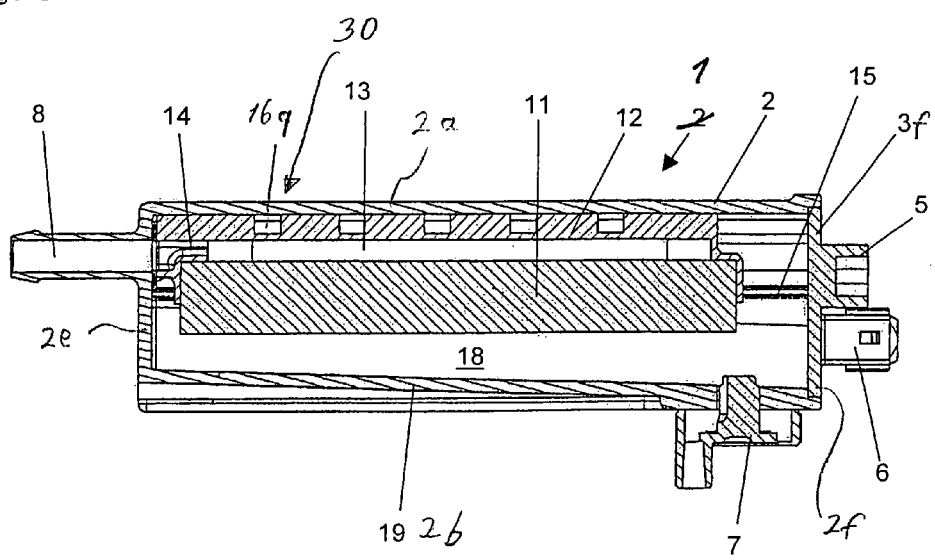
FIG. 4 shows the fuel filter in a section along the cutting line B-B according to FIG. 2.

As can be surmised from the sectional views in FIGS. 3 and 4, the filter housing 2 contains a horizontally extending filter insert with a filter element 11. The filter element 11 is flat. The filter element 11 is block-shaped. The filter element 11 therefore fits into the block-shaped filter housing 2 with ease. The top of the filter element 11 is completely encapsulated by a wall 12; together with the filter element 11, the wall 12 encloses a clean side 13 of the fuel filter. The clean side 13 is essentially above the filter element 11, between the filter element 11 and the wall 12. The clean side 13 is connected via a duct segment 14 to the connection 8 for the fuel outlet. The filter element 11 is inserted inside the filter housing 2 in guide rails 15 provided on the side walls.

The filter element 11 and the wall 12 together constitute a filter insert. The space in the filter housing 2 surrounding the entire filter insert serves as the dirty side of the filter 1. The fuel flows from bottom to top through the filter element 11, from the dirty side to the clean side 13.

Whereas the wall 12 rests against the upper side wall 2a of the filter housing 2 over large regions, in the region of the connection 4 for the fuel inlet, a gap 16 extends in the longitudinal direction of the filter housing 2, between the wall 12 and the upper side wall 2a of the filter housing 2. In the region of the connection 4 for the fuel inlet, a flow baffle 17 is provided, which deflects the fuel entering the filter housing 2 into this gap 16 so that the fuel is distributed from there into the filter housing 2. This significantly reduces the flow velocity of the fuel and prevents turbulence, particularly in the bottom region 18 of the filter housing 2.

Between the wall 12 and the upper side wall 2a grooves can be provided, which extend longitudinally and/or transversely and/or on an incline and/or diagonally. Part or all of the grooves can be let into the wall 12 and/or the upper side wall 2a. The grooves are part of the gap 16. The selected exemplary embodiment has a number of parallel longitudinal grooves 16l and parallel transverse grooves 16q in the side of the wall 12 oriented toward the side wall 2a. The longitudinal grooves 16l and the transverse grooves 16q extend at approximately right angles to one another. These grooves can improve the uniform distribution of fuel over the width of the filter.

The lower side wall 2b of the filter housing 2 slopes down toward the water outlet 7 and thus constitutes a sump for water that is separated out on the dirty side of filter element 11 and collects in the region of the water outlet 7 due to its higher specific weight.

In the fuel filter 1 according to the present invention, the cover 3f of the filter housing 2 is attached to the housing part 3a of the filter housing 2 in a snug, sealed, and nondetachable manner. The housing part 3a and the cover 3f can, for example, be comprised of metal or plastic. Depending on the material of the housing part 3a and cover 3f, these parts are attached to each other, for example, by means of welding, ultrasound welding, vibration welding, friction welding, the application of heat, or crimping. It is also possible, however, to attach the cover 3f to the housing part 3a in a sealed, but detachable fashion so that the filter element 11 in the filter housing 2 can be replaced as needed.

This fuel filter 1 is particularly suited for horizontal installation in a motor vehicle.

Figure 5:
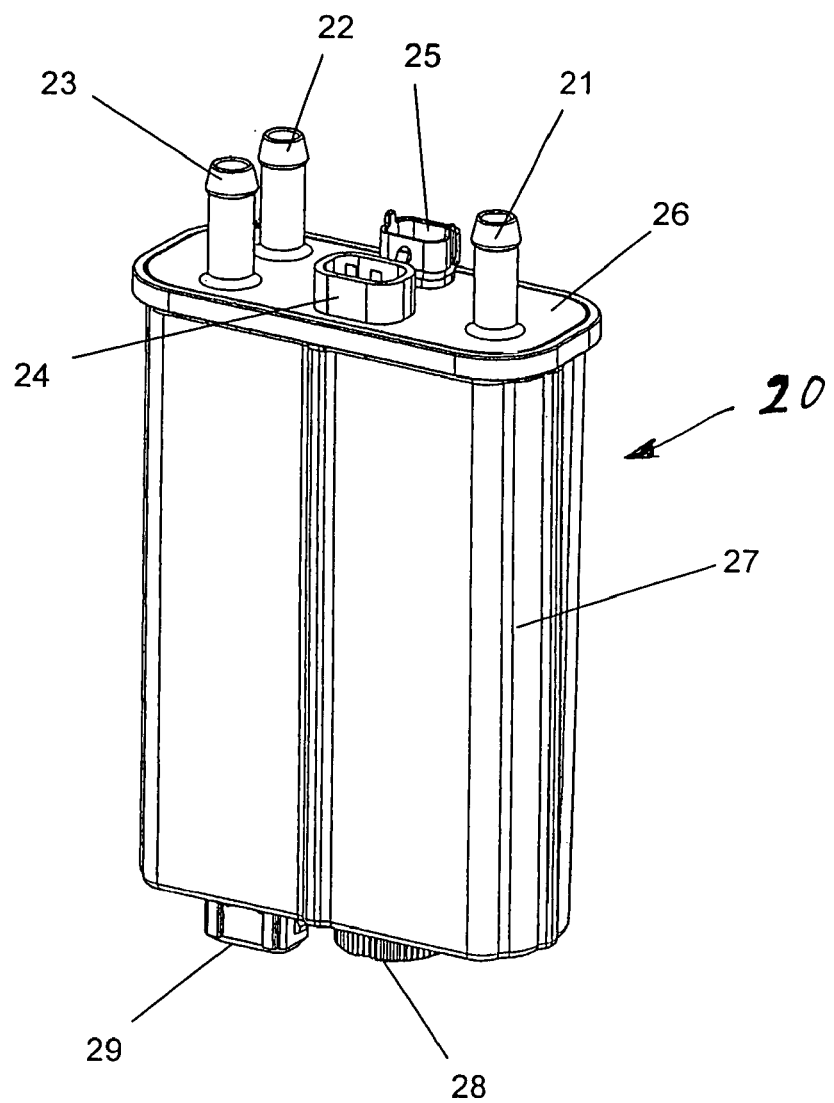
FIG. 5 is a perspective view of a second embodiment form of the fuel filter according to the present invention.

FIG. 5 shows a similar fuel filter 20, which differs from the above-described fuel filter 1 in that it is designed for vertical use; all of the connections 21, 22, 23 for the fuel inlet and for the fuel outlet as well as the electrical connections 24, 25 for a heating unit and a temperature sensor are provided on the upper end of the filter housing 27, which end is embodied in the form of a cover 26. One of the connections 22, 23 for the fuel outlet serves as a fuel return to the tank and is connected to an overflow valve on the inside of the cover 26.

The bottom is merely provided with a water outlet 28 and a connection 29 for a water level sensor for detecting the water level inside the housing.

FIGS. 6 through 11 show different views of and sections through another, preferred, selected, particularly advantageous exemplary embodiment of a flat fuel filter 31.

Figure 6:
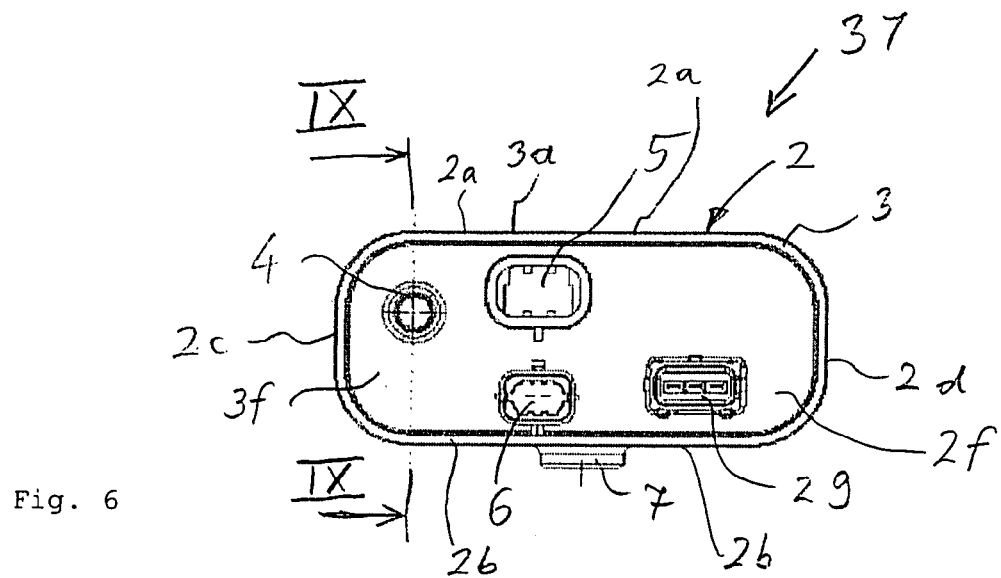
FIG. 6 shows an end view of a third exemplary embodiment of the fuel filter according to the present invention.
Figure 7:
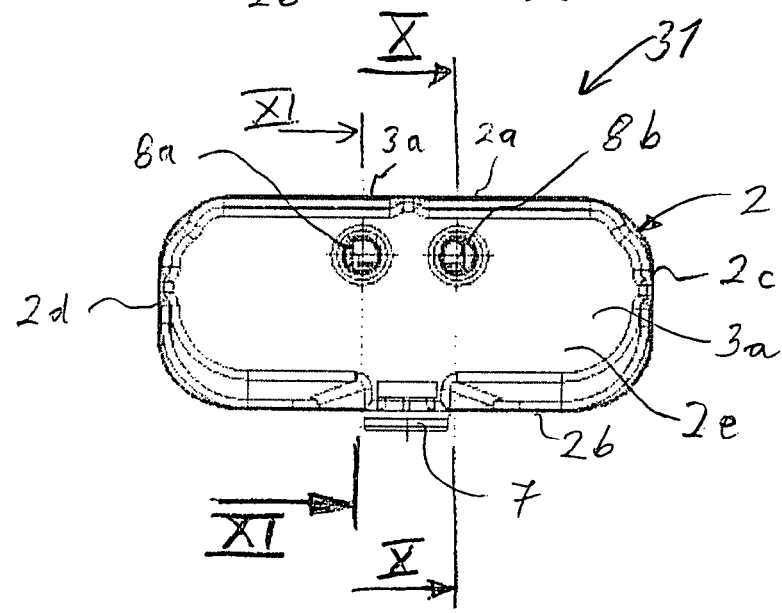
FIG. 7 shows a view of the opposite end from the one shown in FIG. 6.
Figure 8:
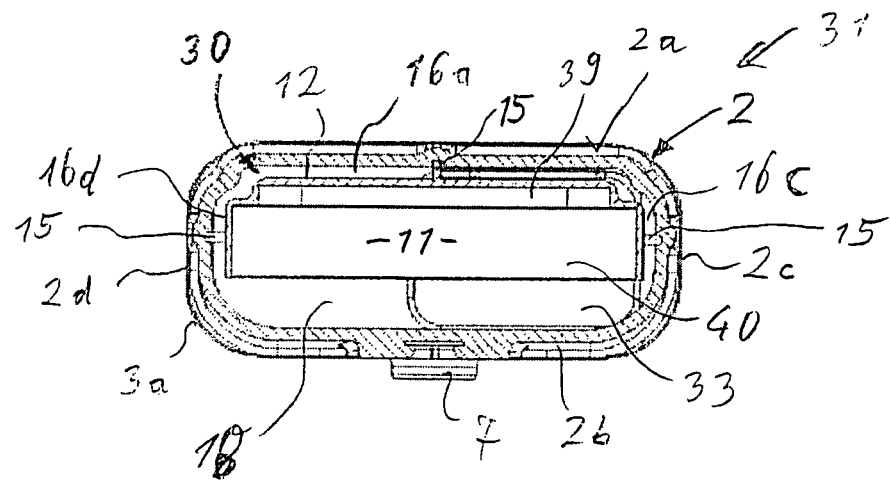
FIG. 8 shows a cross section through the fuel filter of the third exemplary embodiment.

As shown in FIG. 7, the fuel filter 31 has an essentially approximately rectangular end 2e and, as shown in FIG. 6, an essentially approximately rectangular end 2f. In order to insert the filter element 11 into the filter housing 2, the housing part 3a is initially open at the end 2f shown in FIG. 6 and is then closed with the cover 3f during subsequent assembly of the fuel filter 31.

The connection 4 for the fuel inlet is provided on the cover 3f. The cover 3f also has the electrical connection 5 for the heating unit 35, the electrical connection 6 for the temperature sensor 36, and the electrical connection 29 for the water level sensor. The flat lower side wall 2b of the fuel filter 31 accommodates the water outlet 7, which can be opened as needed.

As shown in FIG. 7, the end 2e of the filter housing 2 oriented away from the cover end 2f has two connections 8a and 8b. Both of the connections 8a and 8b serve as fuel outlets. During normal operation of the fuel filter 31, the filtered fuel only comes out of one of two connections 8a or 8b. However, if the pressure in the filter housing 2 were to climb excessively due to excessive soiling, then an overflow valve inside the filter housing 2 would open, permitting the fuel to bypass the filter element 11 and flow out of the filter housing 2.

While the fuel filter is being used, fuel first travels through the cover 3f via the connection 4 serving as the fuel inlet, into an insert 33 provided in the filter housing 2, in the region of the cover 3f. In the region of the connection 4 serving as the fuel inlet, the insert 33 constitutes a cavity that accommodates, for example, a heating unit 35 and a temperature sensor 36. The heating unit 35 is electrically connected by means of the electrical connection 5 and the temperature sensor 36 is electrically connected by means of the electrical connection 6. Inside the insert 33, the fuel is agitated so as to assure a favorable transmission of heat between the heating unit 35 and the fuel on the one hand and between the fuel and the temperature sensor 36 on the other.

Figure 9:
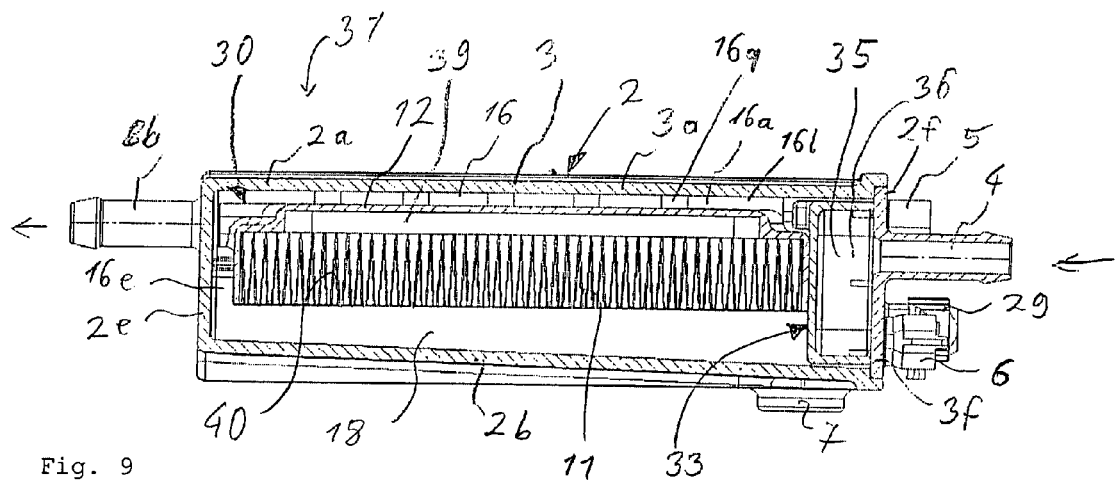
FIG. 9 shows a longitudinal section through the fuel filter along the plane labeled IX-IX in FIG. 6.

From the inside of the insert 33, the fuel travels through an opening 38 (FIG. 10) into the gap 16. A number of openings 38 can be provided one after the other in the horizontal direction or the opening 38 can be embodied in the form of a horizontally extending elongated hole. The gap 16 has a number of sections: an upper gap region 16a, two lateral gap regions 16c and 16d (FIG. 8), and an end gap region 16e (FIG. 9). First, the fuel flows through the opening 38 into the upper gap region 16a. The upper gap region 16a extends over nearly the entire length and width of the filter housing 2. In the region of the side longitudinal wall 2c, the first lateral gap region 16c connects the upper gap region 16a to the bottom region 18. In the region of the side longitudinal wall 2d, the second lateral gap region 16d connects the upper gap region 16a to the bottom region 18. In the region of the end 2e, the end gap region 16e connects the upper gap region 16a to the bottom region 18. If need be, the gap region 16e can be omitted and/or a gap, not shown, can be provided in the region of the end 2f, along the insert 33, which connects the upper gap region 16a to the bottom region 18. The gap regions 16a, 16c, 16d, 16e convey the fuel around the filter element 11 into the bottom region 18. The distribution of the gaps 16c, 16d, and 16e uniformly distributes the fuel from the upper gap region 16a to the bottom region 18. The wall 12 prevents fuel from reaching the filter element 11 directly, instead forcing the fuel to spread out over essentially the entire length of the block-like fuel filter 31.

In all of the selected exemplary embodiments, longitudinal grooves 16l and transverse grooves 16q or other grooves can be provided in the gap 16, preferably in the upper gap region 16a, as explained above in connection with the first exemplary embodiment. Corresponding fuel-distributing grooves can also be provided in the lateral and end gap regions 16c, 16d, 16e.

The guide rails 15 between the filter element 11 and the filter housing 2 are short and interrupted at several points so that the guide rails 15 represent practically no hindrance to the flow of fuel through the gaps.

Distributed uniformly over the entire length of the gap region 16a, the fuel branches out from the upper gap region 16a into the lateral gap regions 16c, 16d, and 16e. In these lateral regions, the fuel flows between the filter housing 2 and the wall 12 enclosing the filter element 11 therein, into the bottom region 18 underneath the filter element 11.

The cross section of the bottom region 18 underneath the filter element 11 is significantly greater than the cross section of the gap 16. The relatively narrow gap 16 with the regions 16a, 16c, 16d, and 16e forces the fuel to flow into the bottom region 18 distributed uniformly over the entire length of the fuel filter 31. As a result, fuel flows to every region of the filter element 11 with practically the same intensity. This makes it possible to favorably exploit the entire volume of the filter element 11.

The relatively large cross section of the bottom region 18 encourages the separation of water in the fuel filter 31.

Because the bottom region 18 has a relatively large cross section, the fuel settles in the bottom region 18 and, without excessive turbulence, can flow from the bottom region 18, through the filter element 11 from bottom to top, into a cavity 39. The cavity 39 extends above the filter element 11 between the filter element 11 and the wall 12, practically over the entire length and width of the filter element 11. The cavity 39 is part of the clean side 13 of the fuel filter 31.

The fuel travels from the cavity 39 through a passage 42a to the connection 8a or through a passage 42b to the connection 8b.

The gap 16 and the bottom region 18 are series connected and matched to each other so that these parts inside the filter housing 2 combine to constitute a particularly effective inlet distribution stabilizer 30. In the selected exemplary embodiments, the gap 16 has the regions 16a, 16b, 16d, 16e and grooves 16l and 16q that are matched to one another. The cross section of the gap 16 is so narrow that the fuel flows into the bottom region 18 in a uniformly distributed fashion. Since the flow of fuel into the bottom region 18 is uniformly distributed, the fuel flows at a low speed, via the shortest route, directly to the closest region of the filter element 11 and a largely uniform fuel quantity flows through each region of the filter element 11.

Figure 10:
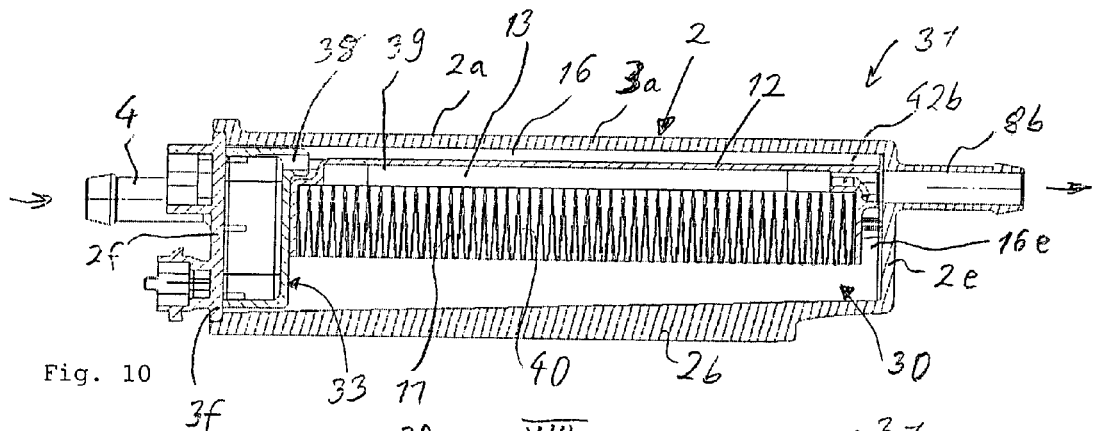
FIG. 10 shows a longitudinal section through the fuel filter along a plane labeled X-X in FIG. 7.
Figure 11:
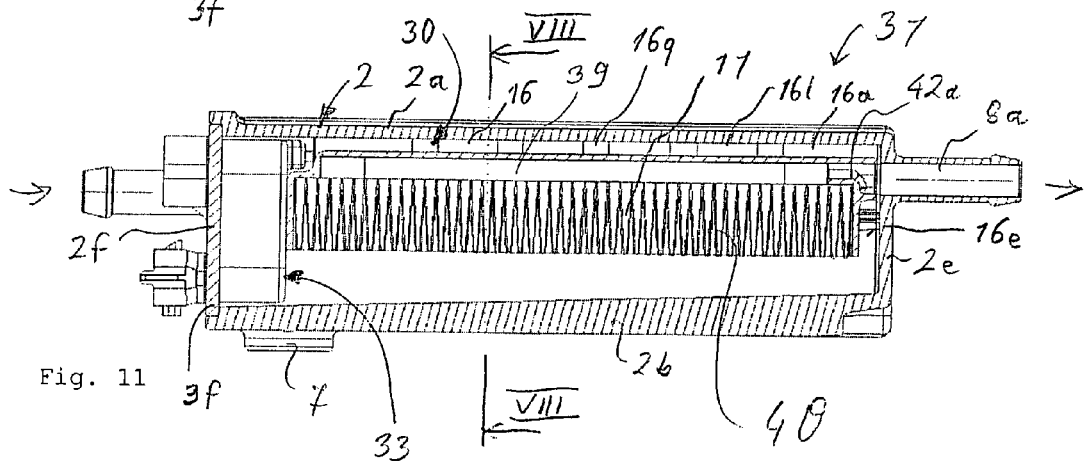
FIG. 11 shows a longitudinal section through the fuel filter along the cutting plane labeled XI-XI in FIG. 7.

As is clear from FIGS. 9, 10, and 11, the filter element 11 is essentially comprised of a folded filter material 40. This folded filter material 40 is sheet-like and, depending on the medium to be filtered, has a thickness of approximately 0.3 mm to 1.5 mm, preferably 0.5 mm to 1.0 mm, in particular 0.7 to 0.8 mm. The filter material 40 is folded so that in the region of the bottom of the filter element 11 and in the region of the top of the filter element 11, the filter material is folded over by almost 180°. This folding makes the filter element 11 as a whole relatively rigid and provides a large overall surface area for trapping impurities. As is clear from the drawings, the folds of the folded filter material 40 extend transversely to the longitudinal direction of the filter housing 2, i.e. the folds extend parallel to the ends of the filter housing 2.

The foregoing relates to preferred exemplary embodiments of the invention, it being understood that other variants and embodiments thereof are possible within the spirit and scope of the invention, the latter being defined by the appended claims.

The invention claimed is:

1. A fuel filter comprising
an elongated flat filter housing having a longitudinal axis,
at least first and second longitudinally extending side walls, and opposing ends extending vertically to said longitudinal axis,
at least one elongated flat filter element contained in the elongated flat filter housing, the at least one elongated flat filter element being arranged overall as planar or flat in shape having a clean side and a dirty side which are both planar and are situated parallel to each other, the clean side being disposed between a first elongated surface of the elongated flat filter element and the first longitudinally extending side wall of the elongated flat filter housing, and the dirty side being disposed between a second elongated surface of the elongated flat filter element and the second longitudinally extending side wall of the elongated flat filter housing, which second elongated surface opposes the first elongated surface, a fuel inlet provided on an end of the elongated flat filter housing delivering fuel to be filtered into the elongated flat filter housing and a fuel outlet provided on an end of the elongated flat filter housing delivering filtered fuel from the elongated flat filter housing, at least one wall encapsulating the clean side of the elongated flat filter element, the at least one encapsulating wall being disposed between the clean side of the elongated flat filter element and the first longitudinally extending side wall of the elongated flat filter housing, wherein the elongated flat filter element and the at least one encapsulating wall together constitute a filter insert which is inserted into the elongated flat filter housing, and a gap in the region of the fuel inlet extending in the longitudinal direction of the elongated flat filter housing between the at least one wall encapsulating the clean side of the elongated flat filter element and the first longitudinally extending side wall of the elongated flat filter housing, wherein the at least one wall encapsulating the clean side of the elongated flat filter element has grooves in the side of the wall oriented toward the first side longitudinally extending wall of the elongated flat filter housing forming part of the gap for uniformly distributing fuel from the fuel inlet over the elongated flat filter element to the dirty side of the elongated flat filter element.

2. The fuel filter according to claim 1, wherein the elongated flat filter element comprises a folded filter material.

3. The fuel filter according to claim 2, wherein the filter material is folded essentially into the shape of a block.

4. The fuel filter according to claim 1, wherein the filter insert comprises an encapsulated clean side that is connected to the fuel outlet.

5. The fuel filter according to claim 3, wherein the filter insert comprises an encapsulated clean side that is connected to the fuel outlet.

6. The fuel filter according to claim 1, wherein the fuel inlet and the fuel outlet are provided on the same end of the elongated flat filter housing.

7. The fuel filter according to claim 1, wherein the fuel inlet and the fuel outlet are provided on opposite ends of the elongated flat filter housing.

8. The fuel filter according to claim 1, further comprising a flow entry that at least reduces turbulence in the region of the side where the flow strikes the elongated flat filter element.

9. The fuel filter according to claim 1, further comprising a flow baffle provided in the fuel inlet.

10. The fuel filter according to claim 9, wherein the flow baffle is inclined upward in relation to the flow direction.

11. The fuel filter according to claim 1, wherein the elongated flat filter housing comprises a block-shaped housing part and a cover that closes the housing part.

12. The fuel filter according to claim 3, wherein the elongated flat filter housing comprises a block-shaped housing part and a cover that closes the housing part.

13. The fuel filter according to claim 11, wherein the housing part and the cover are connected to each other by means of a nondetachable connection.

14. The fuel filter according to claim 1, further comprising a distribution stabilizer on the inlet side.

15. The fuel filter as recited in claim 1, wherein the grooves in the encapsulating wall comprise a plurality of parallel longitudinal grooves and parallel transverse grooves extending at approximately right angles to one another.

16. The fuel filter as recited in claim 1, wherein the second longitudinally extending side wall of the elongated flat filter housing slopes downward toward a water outlet and constitutes a sump for water separated out on the dirty side of the elongated flat filter element.

17. The fuel filter as recited in claim 1, wherein electrical connections for a heating unit, a temperature sensor and a water level sensor are provided on an end of the elongated flat filter housing.

18. The fuel filter as recited in claim 1, wherein the clean side of the elongated flat filter element is between the first elongated surface of the elongated flat filter element and the at least one encapsulating wall.

19. The fuel filter as recited in claim 18, wherein the clean side of the elongated flat filter element is connected via a duct segment to the fuel outlet.

20. The fuel filter as recited in claim 1, wherein the elongated flat filter element is inserted inside the elongated flat filter housing via guide rails provided on the side walls.

* * * * *